United States Patent
Brostrom et al.

(10) Patent No.: US 6,893,167 B1
(45) Date of Patent: May 17, 2005

(54) MOUNTABLE OPTICAL TRANSCEIVER

(75) Inventors: John P. Brostrom, Firestone, CO (US); Bill H. Reysen, Lafayette, CO (US)

(73) Assignee: Opnext, Inc., Fremont, CA (US)

( * ) Notice: Subject to any disclaimer, the term of this patent is extended or adjusted under 35 U.S.C. 154(b) by 28 days.

(21) Appl. No.: 10/051,429

(22) Filed: Jan. 17, 2002

(51) Int. Cl.[7] .................................................. G02B 6/42
(52) U.S. Cl. ..................................................... 385/92
(58) Field of Search ........................ 385/88, 89, 92–94

(56) References Cited

U.S. PATENT DOCUMENTS

| | | | | |
|---|---|---|---|---|
| 4,807,955 A | * | 2/1989 | Ashman et al. ............... | 385/88 |
| 5,134,679 A | * | 7/1992 | Robin et al. ................... | 385/90 |
| 5,155,784 A | * | 10/1992 | Knott .......................... | 385/88 |
| 5,230,030 A | * | 7/1993 | Hartman et al. .............. | 385/50 |
| 5,416,872 A | * | 5/1995 | Sizer et al. ................... | 385/92 |
| 5,561,727 A | * | 10/1996 | Akita et al. ................... | 385/88 |
| 6,213,651 B1 | * | 4/2001 | Jiang et al. ................... | 385/92 |
| 6,287,128 B1 | * | 9/2001 | Jones et al. ................... | 385/88 |
| 6,305,848 B1 | * | 10/2001 | Gregory ....................... | 385/53 |
| 6,508,595 B1 | * | 1/2003 | Chan et al. ................... | 385/92 |
| 6,682,230 B1 | * | 1/2004 | Demangone et al. ......... | 385/88 |
| 2002/0131730 A1 | * | 9/2002 | Keeble et al. ................ | 385/92 |
| 2003/0002823 A1 | * | 1/2003 | Wu .............................. | 385/92 |

* cited by examiner

*Primary Examiner*—Akm Enayet Ullah
*Assistant Examiner*—Mike Stahl
(74) *Attorney, Agent, or Firm*—Finnegan, Henderson, Farabow, Garrett & Dunner, L.L.P.

(57) ABSTRACT

Optical transceiver modules which may be attached to printed circuit boards or other planar supports are presented. The optical transceiver module includes a housing mountable on a board such that a first portion of the housing is above a plane of the board and a second portion of the housing is below the plane of the board. The board may be any planar support, including a circuit board. The plane may be any plane in the board such as a center plane, for example.

13 Claims, 10 Drawing Sheets

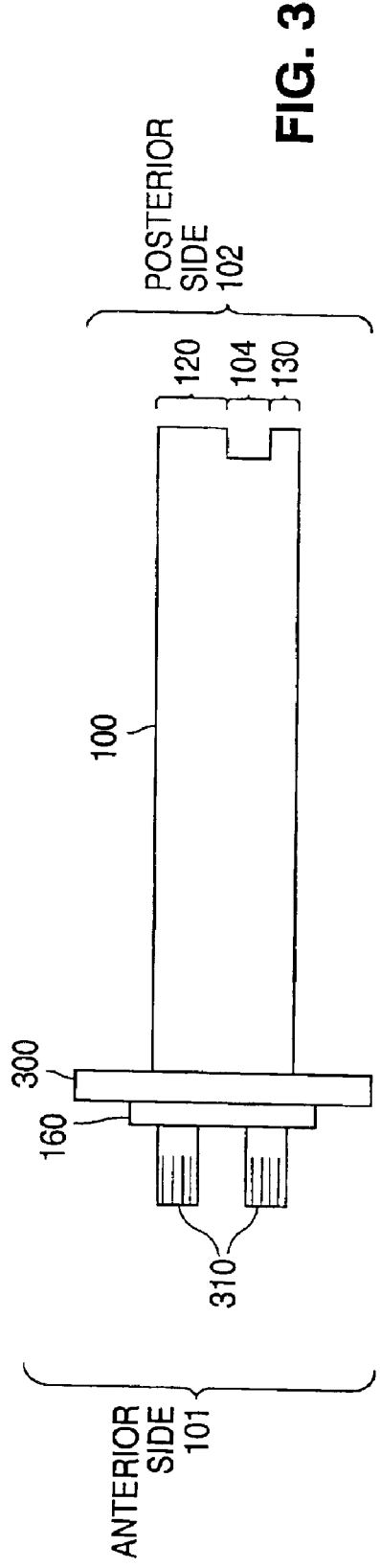
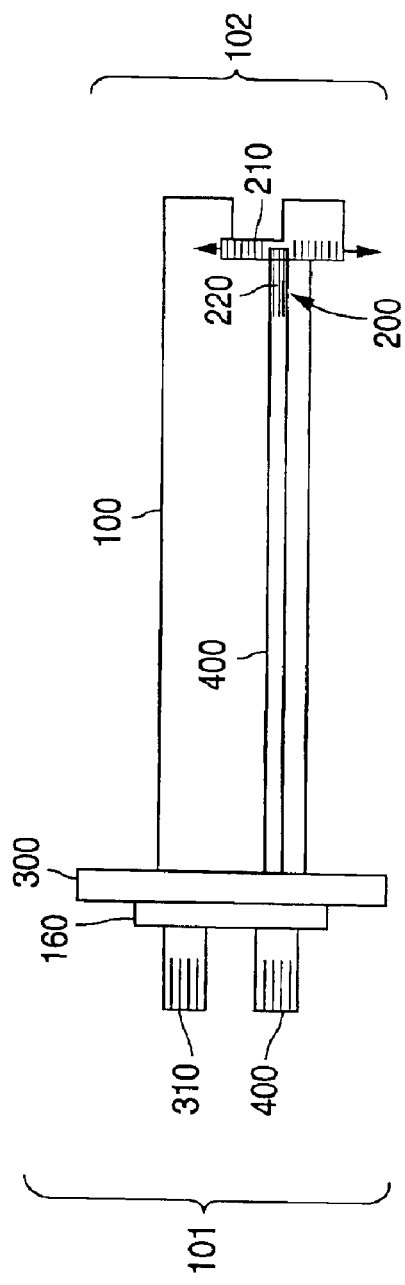

MOUNTABLE OPTICAL TRANSCEIVER

BACKGROUND OF THE INVENTION

1. Field of the Invention

The present invention relates to an optical transceiver housing that mounts and secures to a circuit board and in particular, an optical transceiver housing that efficiently utilizes the available space.

2. Discussion of Related Art

Optical transmission of data is a common method used for telecommunications and data communications. A fiber optic cable is capable of transmitting several wavelengths of light which can carry different channels for different data simultaneously. Optical transceivers translate this optical data from a fiber optic cable into an electrical signal, and vice versa, translating electrical signals into optical data.

Typically, an optical transceiver would be mounted onto one surface of a circuit board. This circuit board is commonly one of many circuit boards mounted in a rack stiffener assembly connected to a backplane and anteriorly secured with a face plate. The clearance between circuit boards is usually small. As optical transceiver technology evolves, more hardware is placed in the optical transceiver module to provide greater functionality. This in turn creates an optical transceiver with a greater size. Unfortunately, the clearance space between circuit boards remains small. Therefore, there is a need for optical transceivers that optimally utilize available space.

SUMMARY

Optical transceiver modules which may be attached to printed circuit boards or other planar supports are presented.

In some embodiments, an optical transceiver module includes a housing mountable on a board such that a first portion of the housing is above a plane of the board and a second portion of the housing is below the plane of the board. The board may be any planar support, including a circuit board. The plane may be any plane in the board such as a center plane, for example.

In some embodiments, an optical transceiver module includes at least a part of a notch and rail system. The notch may be provided by the housing and the rail provided by the board. The inverse is also possible, where the notch may be provided by the board and the rail provided by the housing. The housing slides onto the board via the notch and rail system. In some embodiments, the notch and rail system is adjustable in height. This can be accomplished, for example, using a rack and pinion system. In one implementation the rack is located on a lateral wall of the notch and the pinion impinges upon the rack. When the pinion is turned the rack moves, thereby changing the width of the notch.

In some embodiments, the housing is in a shape of wedge. The wedge shape aids in guiding and securing the optical transceiver module into the board.

In some embodiments, the housing includes a securing mechanism at an interfacing surface of the housing with the board to hold the housing in place against the board. In some implementations, the securing mechanism is a spring clip. Tension provided by the spring clip holds the housing against the board.

In some embodiments, the housing includes at least one attaching mechanism located posteriorly to hold the housing in place in a cut out of the board. In one embodiment, the attaching mechanism includes at least part of a notch and rail system. In another embodiment, the attaching mechanism includes a latch arm that secures to the board through a hole in the board. In another embodiment, the attaching mechanism includes a screw that screws into a threaded piece attached to the board.

In some embodiments of the invention, the housing includes a heat sink coupled to an exposed surface. The heat sink is made of a heat conductive material and may include heat fins.

An optical transceiver module which can be mounted through the center plane of a circuit board or other planar support allows the optical transceiver module to better reside in a rack stiffener assembly which has limited clearance between circuit boards. In particular, such a transceiver module can be larger than conventional transceiver modules and thus accommodate more functionality and still fit into the space between boards.

These and other embodiments of the invention are further discussed below with respect to the following figures.

BRIEF DESCRIPTION OF THE DRAWINGS

FIG. 3 is a lateral view of an embodiment of an optical transceiver housing that may be secured to a board using a posterior notch.

FIG. 4 is a lateral view of an embodiment of an optical transceiver housing that may be secured to a board using an adjustable posterior notch.

It should be noted that the dimensions in the figures are not necessarily to scale. Like reference numbers in the various figures denote like parts in the various embodiments.

DETAILED DESCRIPTION

Figure 1A:
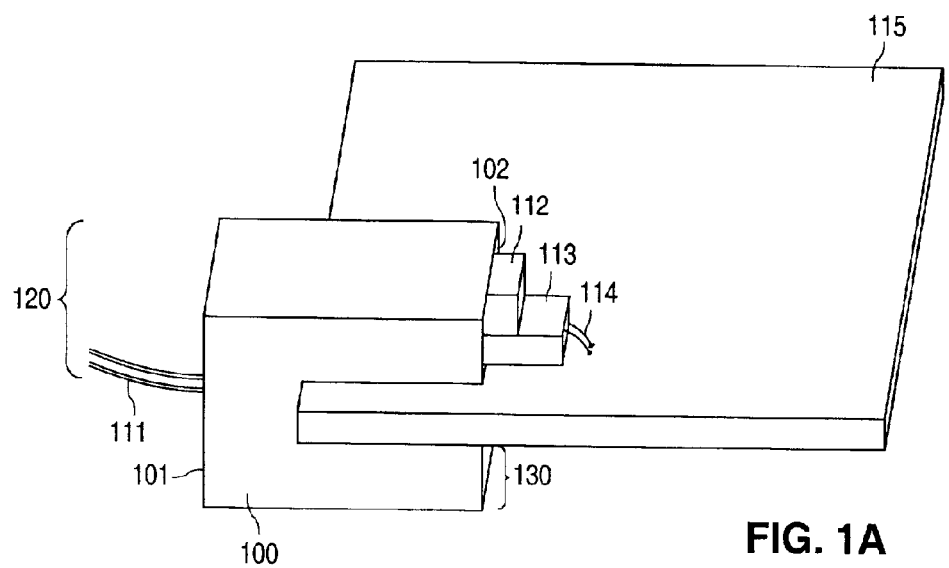
FIG. 1A is a perspective view of an embodiment of an optical transceiver housing coupled to an electrical connector.

FIG. 1A shows an embodiment of an optical transceiver housing 100 mounted on a board 115. This particular embodiment shows the conventional input and output of an optical transceiver with fiber optic 111 input through anterior side 101 of housing 100. In addition, electrical output from the optical transceiver occurs through transceiver mounted plug 112 which docks onto board mounted plug 113 on posterior side 102 of housing 100.

In some embodiments, the bottom surface of transceiver mounted plug 112 electrically interfaces with the top surface of board mounted plug 113. One skilled in the art will recognize a number of connectors for coupling electrical signals from housing 100 to circuitry on or in board 115. The electrical output signals exit board mounted plug 113 through electrical leads 114, which can be coupled to electrical conductors on board 115.

Figure 1B:
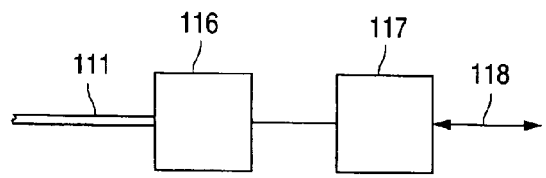
FIG. 1B is a block diagram of an optical transceiver that may be mounted in a housing according to the various embodiments.

FIG. 1B shows a block diagram of an embodiment of an optical transceiver. Optical fiber 111 provides optical data signals to or receives optical data signals from the optical transceiver's detector/source 116. When receiving data signals from fiber optic cable 111 the detector/source 116 is a detector of the light emitted from fiber optic cable 111. The optical data input signals are translated into electrical data which are then transmitted electrically to the transceiver's driver 117. Driver 117 drives the electrical data signals through the electrical output conductors 118. As a transmitter, electrical data signals are provided through electrical conductors 118 to driver 117. Driver 117 drives optical source 116 to emit optical signals which are coupled into optical fiber 11. The data signals exit the optical transceiver through fiber optic cable 111. Detector/source 116, driver 117, and other components of an optical transceiver may be housed in embodiments of optical transceiver housing 100 disclosed herein.

Figure 1E:
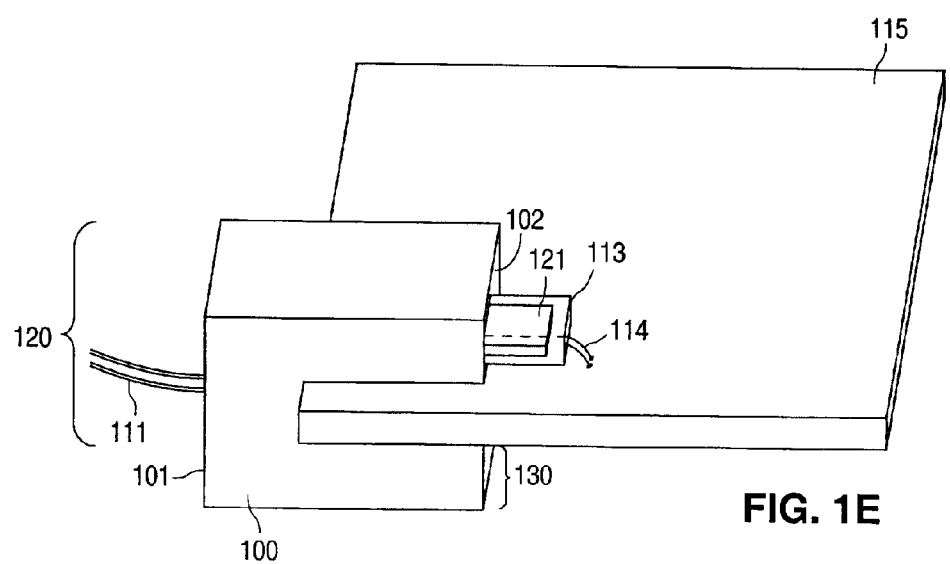
FIG. 1E is a perspective view of another embodiment of an optical transceiver housing coupled to an electrical connector.

FIG. 1E shows another embodiment similar to that of FIG. 1A. In this embodiment a circuit board 121 posteriorly extends from housing 100 into a card edge connector 113 mounted on board 15. Electrical output signals from the optical transceiver are conducted through circuit board 121 which docks into card edge connector board mounted plug 113. As in FIG. 1A, electric output signals exit card edge connector board mounted plug 113 through electrical leads 114 which can be connected to conductors on board 15.

Figure 1C:
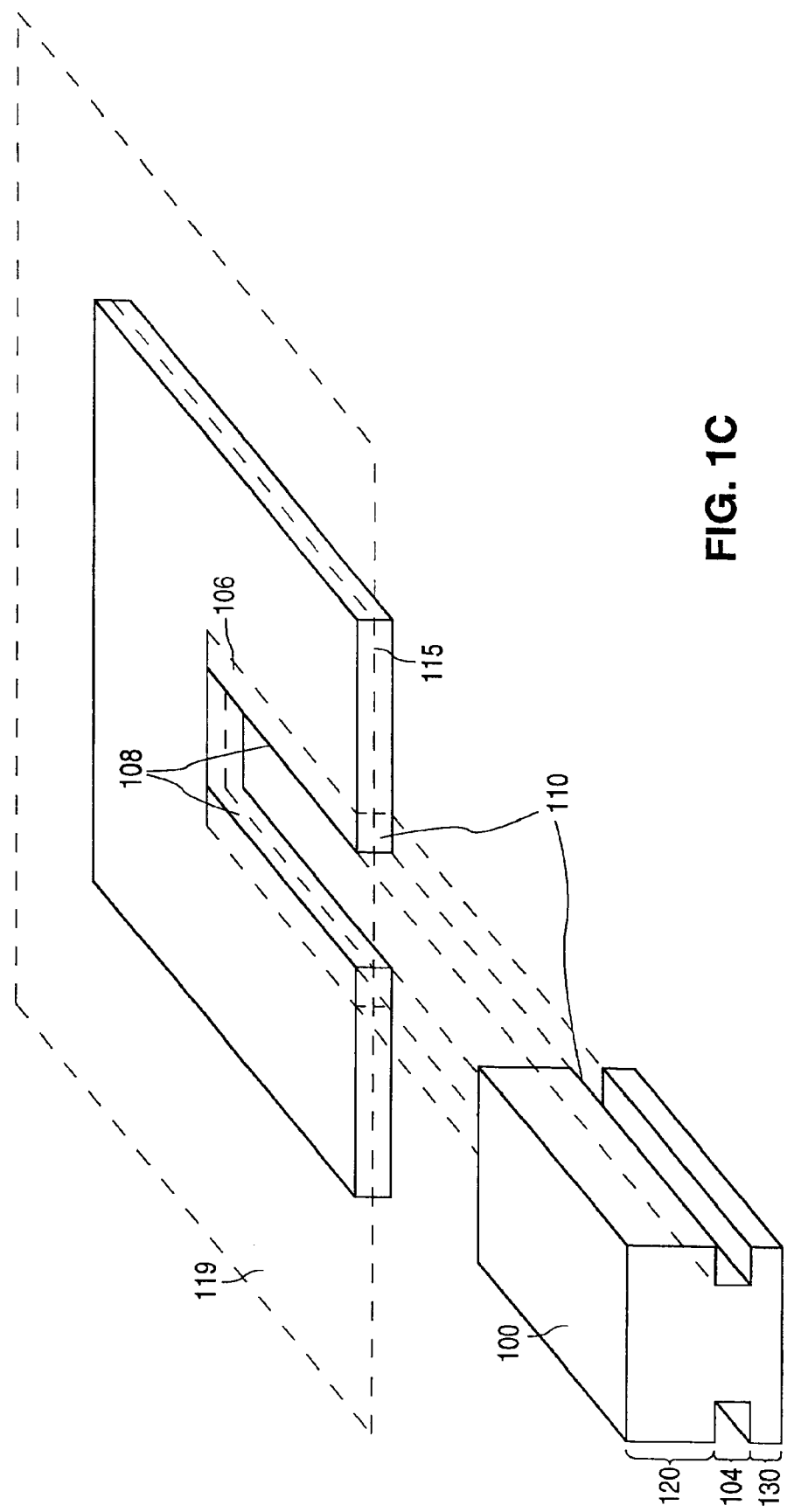
FIG. 1C is a perspective, partially transparent view of an embodiment of an optical transceiver housing.
Figure 1D:
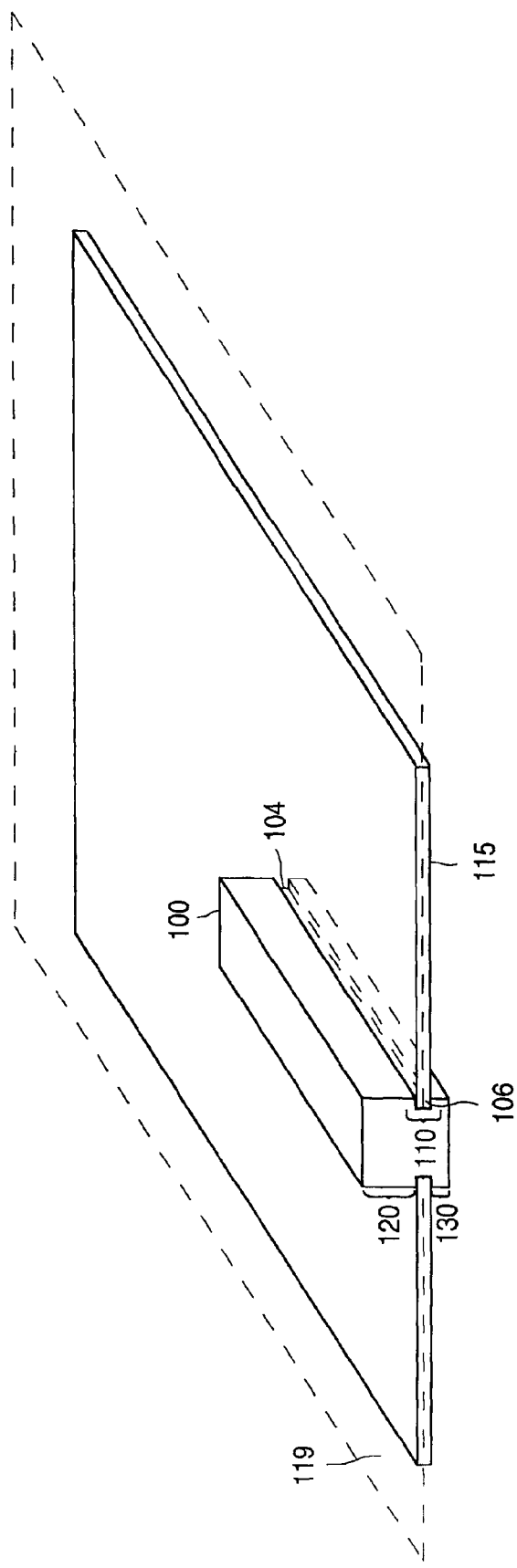
FIG. 1D is a perspective view of an optical transceiver housing as shown in FIG. 1C mounted onto a board.

FIGS. 1C and 1D show an optical transceiver housing 100 according to some embodiments of the present invention. In these embodiments, optical transceiver housing 100 includes part of a notch and rail system 110 comprising one or more notches 104 and a one or more rails 106. Notches 104 reside on the lateral sides of the optical transceiver housing. Rails 106 are provided by lateral edges 108 of a cutout portion of board 115. In the illustrated embodiment, notches 104 allow optical transceiver housing 100 to slide onto board 115 using edges 108 of the board as rails 106. As shown in FIG. 1D, optical transceiver housing 100 slidably mounts onto board 115 and has an upper portion 120 above a plane 119 of board 115 and a lower portion 130 below plane 19 of board 115. Plane 119 is a plane located anywhere within board 115.

Notch and rail system 10 may be implemented in other ways, as well. For example, housing 100 could provide a rail similar to rail 106 that would fit into a notch provided by board 115 similar to notch 104. In another example, pins that fit in notch 104 replace rail 106 to provide similar supporting and guiding functions. In another embodiment, the notch and rail system does not run the full length or width of housing 100.

Figure 2:
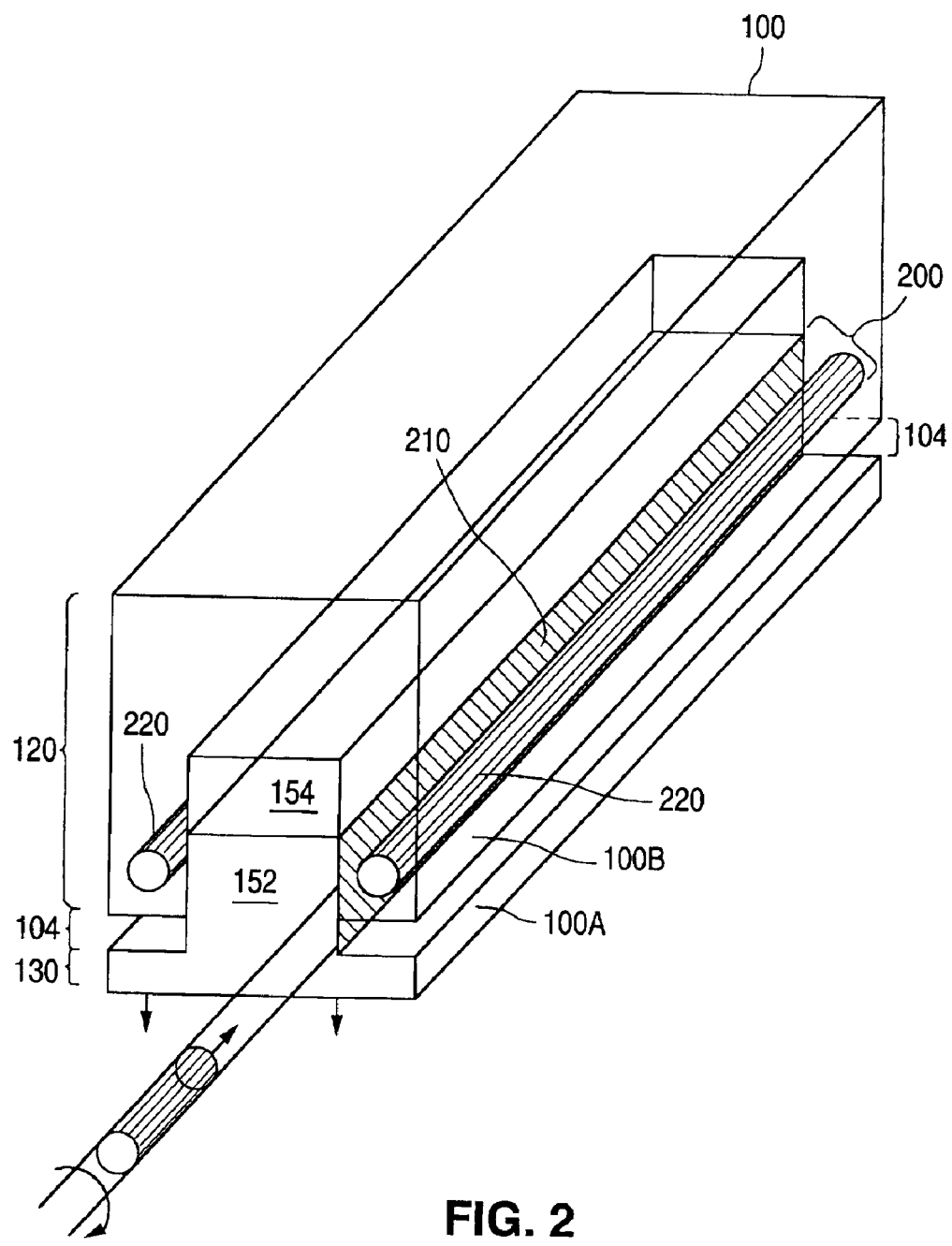
FIG. 2 is a perspective, partially transparent view of an embodiment of an optical transceiver housing that provides part of an adjustable notch and rail system.

FIG. 2 shows an embodiment in which notch and rail system 10 is adjustable by a rack and pinion system 200. In this embodiment, housing 100 includes a sub housing 100A with a T-shaped cross-section and a sub-housing 100B with a U-shaped cross-section. Sub-housing 100A includes a tongue 152 that fits vertically into a groove 154 defined by sub-housing 100B. Rack and pinion system 200 controls the depth at which sub-housing 100A is inserted into sub-housing 100B, thereby adjusting the height of notch 104 formed between two opposing surfaces of sub-housings 100A and 100B. Rack and pinion system 200 includes a rack 210 formed on a lateral surface of sub housing 100A and a pinion gear 220 rotatably mounted to sub-housing 100B and engaged to rack 210. When pinion gear 220 is turned against rack 210, sub-housing 100A is moved relative to sub-housing 100B to adjust the height of notch 104. The rack and pinion system 200 in this embodiment allows notch 104 to adjust for a thicker or thinner rail 106 FIG. 1C) provided by any size board. Alternatively, a similar adjustable notch system can be attached to board 115 to accommodate any size rail provided by optical transceiver housing 100. Such a notch system may include adjustable clamps fixed to a board providing notches that can engage rails provided by an embodiment of housing 100 (not shown). Another alternative (not shown) may provide a rack and pinion system similar to rack and pinion system 200 attached to a board which provides an adjustable shelf on which optical transceiver housing 100 may rest, with an upper portion 120 and a lower portion 130 extending from board 115.

FIG. 3 shows a lateral view of optical transceiver housing 100 according to another embodiment. In this embodiment, housing 100 may be attached at its posterior side 102 to a board such as board 115 shown in FIGS. 1A and 1C–1E. FIG. 3 shows a notch 104 on the posterior side of housing 100 that may secure housing 100 to a rail provided, for example, by an edge of the board. FIG. 3 also shows anterior side 101 of housing 100 attached by screws 310 to a face plate 300 of a chassis, for example, in which the board is mounted. Optical transceiver housing 100 may include a flange 160 as shown in FIG. 3. In such embodiments, optical transceiver housing 100 may be inserted through an opening in face plate 300 and positioned such that flange 160 is flush with face plate 300. Screws 310 may then be passed through holes in flange 160 to attach housing 100 to face plate 300.

FIG. 4 shows another embodiment similar to that of FIG. 3. In this embodiment, rack and pinion system 200 may be used to adjust the height of a notch on the posterior side 102 of housing 100. This notch may be used to secure housing 100 to a rail provided, for example, by the edge of a circuit board. As in the embodiment illustrated in FIG. 3, anterior side 101 of housing 100 may be attached to a face plate 300 with, for example, screws 310 and 400. In this embodiment, screw 400 may be coupled to pinion gear 200 so that the height of the notch in posterior side 102 of housing 100 may be adjusted by turning screw 400. Alternatively, a rack and pinion system located on a board to which housing 100 is to be mounted may be operated by screw 400. In such embodiments, screw 400 may be operated to adjust the height of a notch provided by the board and located to engage a rail provided on posterior side 102 of housing 100.

Figure 5A:
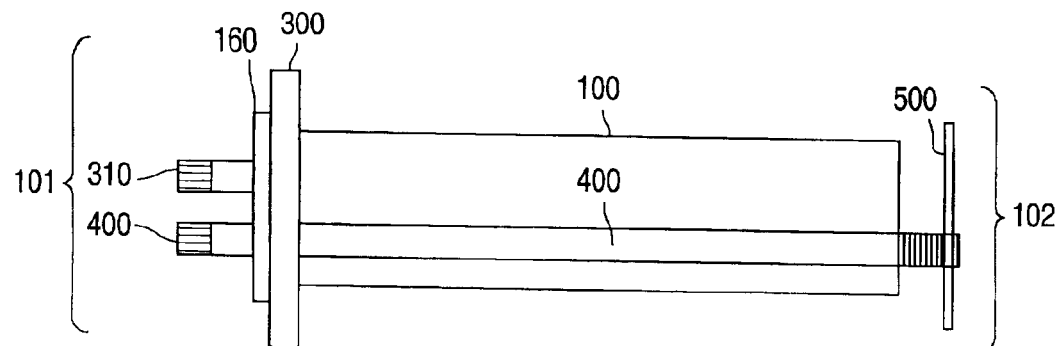
FIG. 5A is a lateral view of an embodiment of an optical transceiver housing that includes a securing mechanism.
Figure 5B:
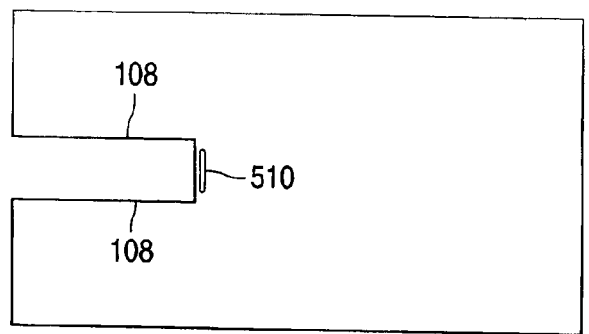
FIG. 5B a top view of a board to which the embodiment of FIG. 5A may be attached
Figure 5C:
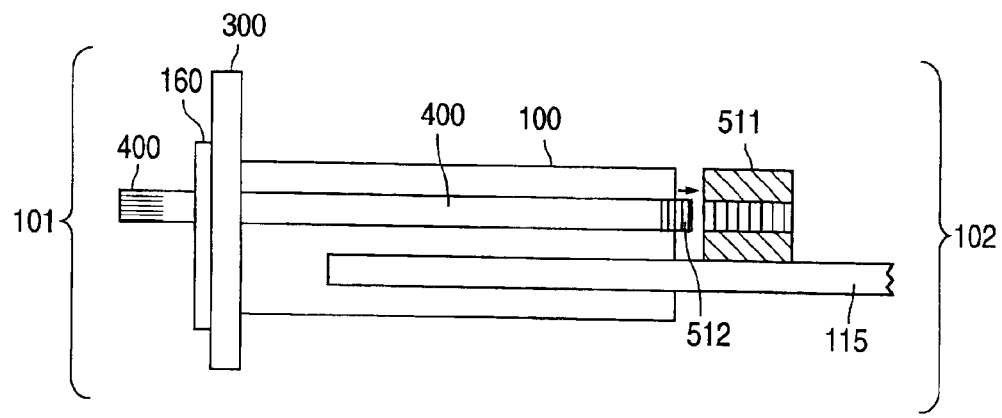
FIG. 5C is a lateral view of another embodiment of an optical transceiver housing that includes a securing mechanism.

FIGS. 5A, 5B, and 5C illustrate other embodiments that allow optical transceiver housing 100 to be attached posteriorly to a board. FIGS. 5A and 5B show a particular embodiment that is similar to the embodiment described in FIG. 4, except screw 400 is coupled to a latch arm 500 which can be rotated through a hole 510 in board 115 (see FIG. 5B) to lock housing 100 to board 115. Other mechanisms controlled by screw system 400 can be used to achieve the same function, such as that shown by FIG. 5C. FIG. 5C shows an embodiment in which screw 400 has a threaded end 512 that passes through housing 100 and screws into a threaded piece 511 attached to board 115, thereby securing housing 100 to board 115.

In other embodiments an optical transceiver housing 100 may include combinations of the features described above. For example, an embodiment can include a lateral notch and rail system (FIG. 1C, for example) in addition to a posterior notch and rail system (FIG. 3, for example). Either or both notch and rail systems may be adjustable by rack and pinion systems (FIGS. 2 and 4, for example).

Figure 6:
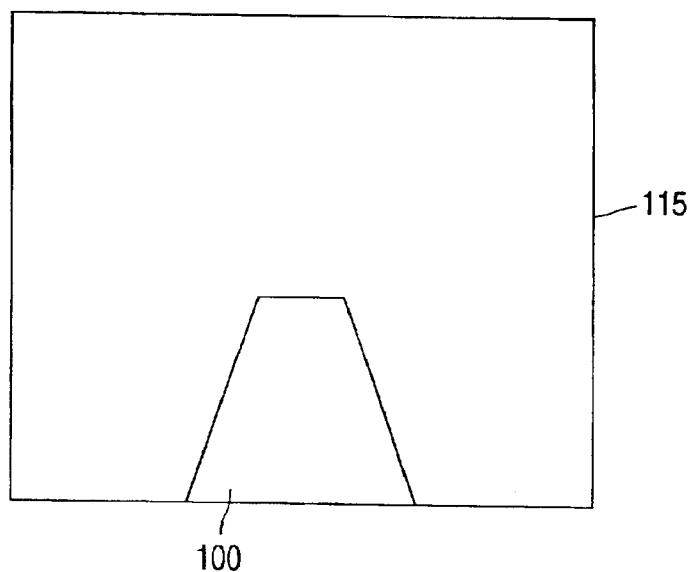
FIG. 6 is a top view of another embodiment of an optical transceiver housing attached to a board.
Figure 7:
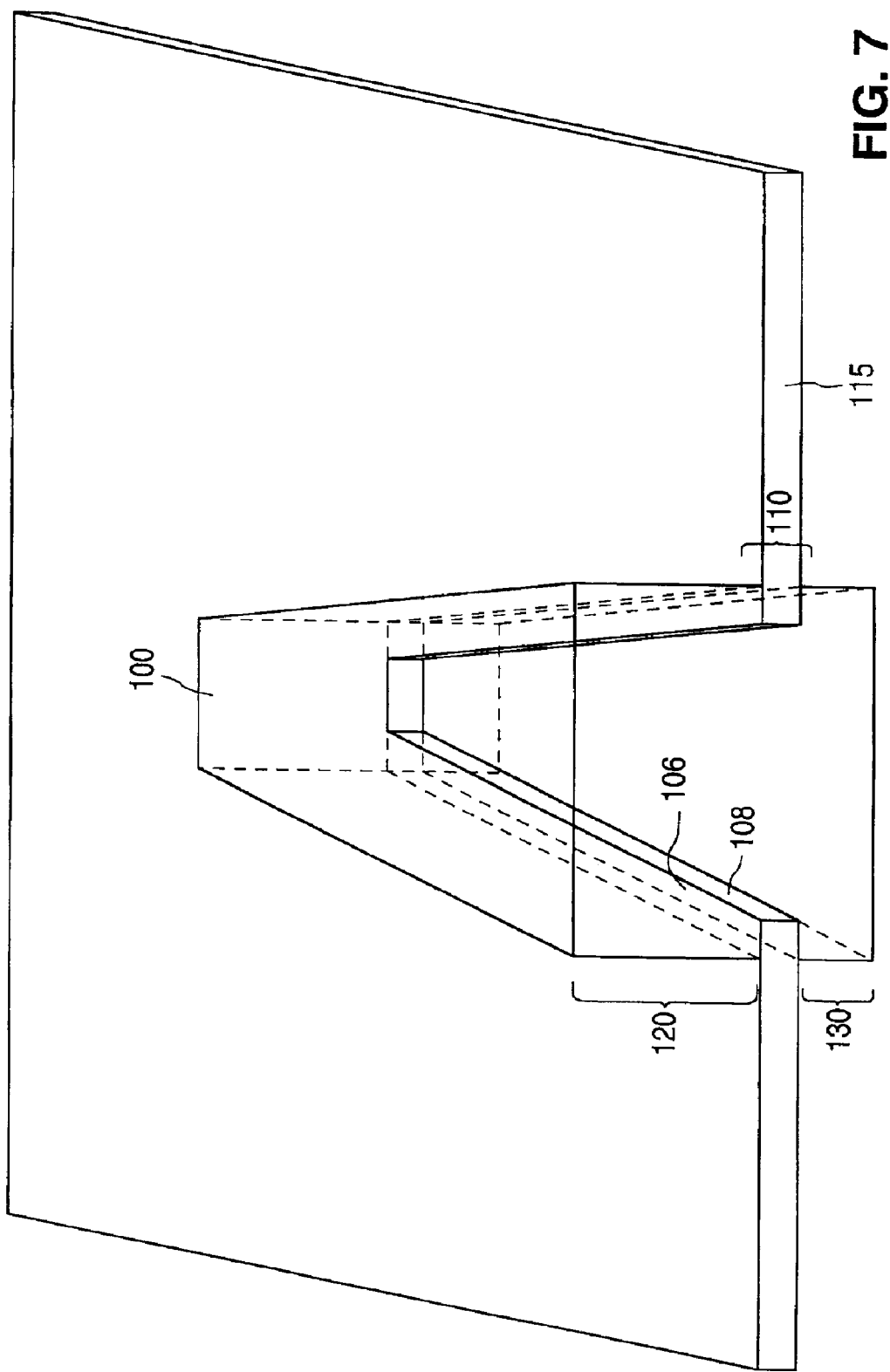
FIG. 7 is a perspective view of the optical transceiver housing depicted in FIG. 6 mounted on a board.

FIGS. 6 and 7 show an embodiment in which optical transceiver housing 100 has a wedge shape. FIG. 6 is a top view of the housing 100 mounted on a board 115. The wedge shape can aid in guiding the optical transceiver onto board 115 and provide optimal docking of a transceiver to electrical leads on board 115. Such embodiments may be similar to the embodiments describe above, for example, but for the wedge shape of housing 100.

Figure 8A:
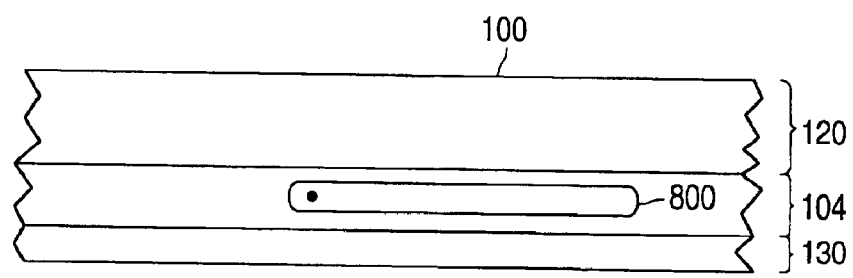
FIG. 8A is a lateral view of a securing mechanism in one embodiment.
Figure 8B:
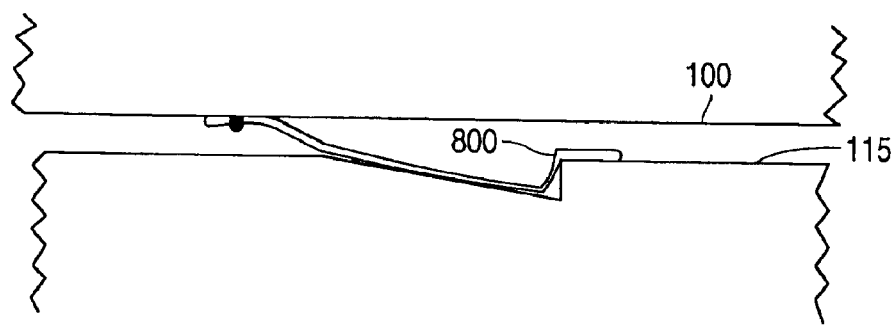
FIG. 8B is a top view of the securing mechanism depicted in FIG. 8A.

In the embodiment shown in FIGS. 8A and 8B, a securing mechanism 800 is located in notch 104 of optical transceiver housing 100. FIGS. 8A and 8B show, respectively, side and top views in which securing mechanism 800 is implemented as a spring clip. Securing mechanism 800 provides tension at the interface between notch 104 of optical transceiver housing 100 and rail 106 of board 115. Any number of mechanisms 800 may be attached to either housing 100 or board 115. In other embodiments a securing mechanism 800 may include a spring covered by a button embedded in either interfacing surface (housing 100 or board 115).

Figure 9:
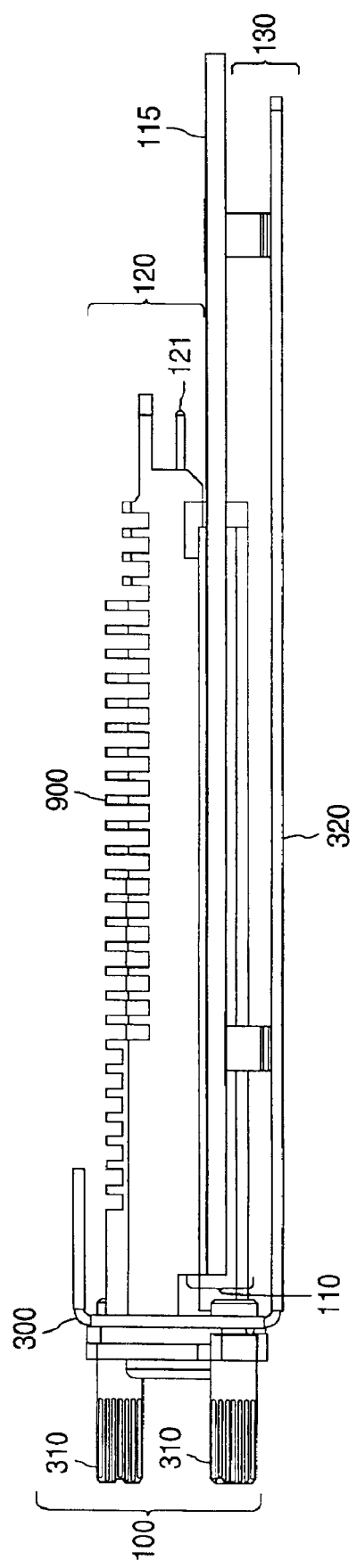
FIG. 9 is a lateral view of an embodiment of an optical transceiver housing that includes heat fins.

FIG. 9 is a lateral view of another embodiment of housing 100. In this embodiment, housing 100 includes heat fins 900 that can be used to dissipate heat generated by the optical transceiver. Heat fins 900 can be located on the top surface of housing 100 (as shown), the bottom surface of housing 100 (not shown), or both top and bottom surfaces (not shown). Also shown in this particular embodiment are screws 310 used to anteriorly secure the optical transceiver housing 100 to face plate 300 of a chassis 320 in which board 115 is mounted. Housing 100 is laterally secured to board 115 using notch and rail system 110. Upper portion 120 of housing 100 is positioned above a plane of board 115. Lower portion 130 of housing 100 is positioned below the plane of board 115.

Figure 10:
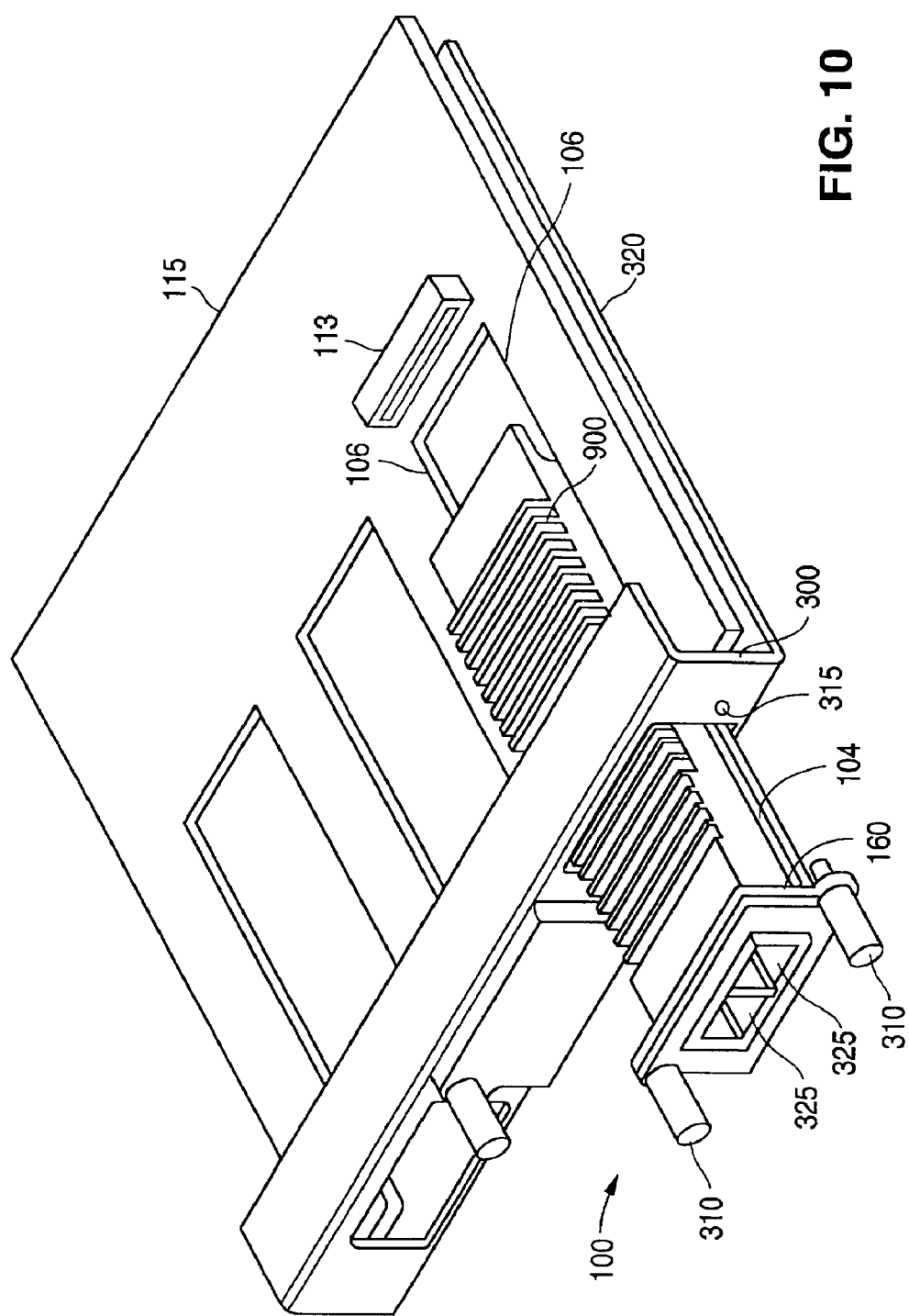
FIG. 10 is a perspective view of the optical transceiver housing of FIG. 9 partially inserted in a chassis.

FIG. 10 is a perspective view showing the optical transceiver housing 100 of FIG. 9 partially inserted into a chassis 320 in which board 115 is mounted. Notch 104 on housing 100 has engaged rails 106 formed by the edge of a cut out portion of board 115. In this embodiment, optical transceiver housing 100 (and the transceiver it contains) may be installed in chassis 320 by sliding transceiver housing 100 along board 115 until flange 160 is flush with face plate 300 and circuit board 121 extending from optical transceiver housing 100 (visible in FIG. 9) docks with card edge connector 113. Screws 310, which pass through flange 160 of optical transceiver housing 100, may then be tightened to engage threads in tapped holes 315 of face plate 300. Optical fibers may be coupled to a transceiver in transceiver housing 100 using, for example, conventional fiber optic receptacles 325.

The particular embodiments discussed above are illustrative only and are not intended to be limiting. One skilled in the art will recognize various alternatives which are intended to be within the spirit and scope of this disclosure. As such, the invention is limited only by the following claims.

We claim:

1. An optical transceiver, comprising:

a housing mountable on a board with a portion of the housing above a plane of the board and a second portion of the housing below the plane of the board;

wherein the housing includes part of a notch and rail system;

wherein the notch of the notch and rail system is adjustable in height.

2. The optical transceiver of claim 1, wherein the notch is adjusted by a rack and pinion system comprising a rack located on a lateral wall of the notch and a pinion which impinges upon the rack whereby turning the pinion adjusts the height of the notch.

3. An optical transceiver, comprising:

a housing mountable on a board with a portion of the housing above a plane of the board and a second portion of the housing below the plane of the board;

wherein the portion of the housing above the plane of the board and the second portion of the housing below the plane of the board are external to the board; and wherein the housing has a wedge shape.

4. An optical transceiver, comprising:

a housing mountable on a board with a portion of the housing above a plane of the board and a second portion of the housing below the plane of the board;

wherein the housing has at least one screw hole located to receive a screw passing through a face plate of an enclosure in which said board is mounted.

5. An optical transceiver, comprising:

a housing mountable on a board with a portion of the housing above a plane of the board and a second portion of the housing below the plane of the board;

wherein the portion of the housing above the plane of the board and the second portion of the housing below the plane of the board are external to the board; and wherein the housing includes at least one attaching mechanism located posteriorly to hold the housing in place in a cut out of the board.

6. The optical transceiver of claim 5, wherein the attaching mechanism includes at least part of a notch and rail system.

7. The optical transceiver of claim 5, wherein the attaching mechanism includes a latch arm that secures to the board through a hole in the board.

8. The optical transceiver of claim 5, wherein the attaching mechanism includes a screw that screws into a threaded piece attached to the board.

9. The optical transceiver of claim 1, wherein the housing includes a notch.

10. The optical transceiver of claim 1, wherein the housing includes a rail.

11. The optical transceiver of claim 1, wherein the notch and rail system is located on at least one side of the optical transceiver housing.

12. The optical transceiver of claim 1, wherein the housing includes a securing mechanism at an interfacing surface of the housing with the board to hold the housing in place against the board.

13. The optical transceiver of claim 12, wherein the securing mechanism is a spring clip.

* * * * *